(12) United States Patent
Kim et al.

(10) Patent No.: US 8,695,441 B2
(45) Date of Patent: Apr. 15, 2014

(54) FLEXIBLE FORCE OR PRESSURE SENSOR ARRAY USING SEMICONDUCTOR STRAIN GAUGE, FABRICATION METHOD THEREOF AND MEASUREMENT METHOD THEREOF

(75) Inventors: Min Seok Kim, Daejeon (KR); Yon-Kyu Park, Daejeon (KR); Dae Im Kang, Daejeon (KR); Han Wook Song, Daejeon (KR); Sungjun Lee, Daejeon (KR); In-Mook Choi, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 496 days.

(21) Appl. No.: 13/051,063

(22) Filed: Mar. 18, 2011

(65) Prior Publication Data

US 2011/0226069 A1    Sep. 22, 2011

(30) Foreign Application Priority Data

Mar. 18, 2010 (KR) .......................... 10-2010-0024030
Mar. 2, 2011 (KR) .......................... 10-2011-0018473

(51) Int. Cl.
 *G01L 1/22* (2006.01)
(52) U.S. Cl.
 USPC .................................................. 73/862.045
(58) Field of Classification Search
 USPC .................................................. 73/862.045
 See application file for complete search history.

(56) References Cited

U.S. PATENT DOCUMENTS

| 4,555,953 | A  | * | 12/1985 | Dario et al. | ............. | 73/862.046 |
| 6,864,111 | B2 | * | 3/2005  | Yu et al.    | ............. | 438/22     |
| 7,673,528 | B2 | * | 3/2010  | Yoon et al.  | ............. | 73/862.041 |
| 8,154,527 | B2 | * | 4/2012  | Ciesla et al.| ............. | 345/173    |

FOREIGN PATENT DOCUMENTS

| WO | WO 99-39394 A1    | 8/1999 |
| WO | WO2009053492 A1   | 4/2009 |

OTHER PUBLICATIONS

Kim, Min-Sok et al., "Tactile Devices that Mimics Human's Sensory System", Physics and High Technology, Sep. 2010, pp. 15 22.

* cited by examiner

*Primary Examiner* — Lisa Caputo
*Assistant Examiner* — Octavia Davis-Hollington
(74) *Attorney, Agent, or Firm* — Christensen O'Connor Johnson Kindness PLLC (57) ABSTRACT

The force or pressure sensor array of the present invention effectively has both flexibility and elasticity. Since the substrate itself is a kind of a polymer material, the substrate can be bent or expanded. Although silicon, which is a material of the semiconductor strain gauge, is easily broken and solid, mechanical flexibility can be secured if it is fabricated extremely thin. To this end, particularly, disclosed is a flexible force or pressure sensor array using semiconductor strain gauges 110, the sensor array comprising: a substrate 10 including: the semiconductor strain gauges 110 in which a plurality of elements formed in a certain array pattern is deformed by force or pressure, a pair of polymer film layers 120 and 130 having film surfaces contacted facing each other and containing the semiconductor strain gauge 110 between the film surfaces contacted with each other, and a pair of signal line layers formed on top and bottom surfaces of an insulating layer using either of the pair of polymer film layers 120 and 130 as the insulating layer and connected to the elements 111 of the array pattern to form electrodes, for fetching deformation signals outputted due to deformation of the elements 111 to outside; and a pair of elastomer layers 20 and 30 formed on both sides of the substrate 10 to contain the substrate 10 inside.

8 Claims, 8 Drawing Sheets

FLEXIBLE FORCE OR PRESSURE SENSOR ARRAY USING SEMICONDUCTOR STRAIN GAUGE, FABRICATION METHOD THEREOF AND MEASUREMENT METHOD THEREOF

TECHNICAL FIELD

The present invention relates to a flexible force or pressure sensor array using a semiconductor strain gauge, and more specifically, to a force or pressure sensor array using a semiconductor strain gauge, a method of fabricating the force or pressure sensor array, and a method of measuring force or pressure using the force or pressure sensor array, in which a high-sensitive semiconductor strain gauge is used, and flexible and stabile polymer film layers and elastomer layers are configured.

BACKGROUND ART

In fabricating a force or pressure sensor array, conventionally, a strain gauge is configured using a Ni/Cr or Cu/Ni metal layer. However, this method is disadvantageous in that since a gauge factor is lower than that of a semiconductor strain gauge as much as 50 to 100 times, sensitivity is lowered as much.

The semiconductor strain gauge is fabricated by injecting impurities into mono-crystalline or polycrystalline silicon, and since the gauge factor is considerably high as much as 150, the semiconductor strain gauge has a high-sensitive sensing capability. However, due to lack of flexibility and problems of conventional fabricating processes that cannot be done together with like a polymer-based fabricating process, its application to a flexible and bendable force or pressure sensing array is limited.

On the other hand, a force or pressure sensor array has been constructed using a force- or pressure-sensitive conductive rubber or ink layer, which is a mixture produced by blending conductive tiny metal powder using rubber or polymer as a base material. If power or pressure is applied, the base material is deformed, and the distance among the particles of the metal powder in the rubber or ink layer is narrowed, or the particles are contacted with one another. Accordingly, a path for flowing electricity is created, and thus resistance is reduced. Since a large-area sensor array can be fabricated at a low cost, the sensor array is already widely used as an element for measuring distribution of pressure for medical or ergonomic purposes. However, since the characteristics of the sensor array depend on conductivity of the metal particles scattered in the base material, repeatability and restorability are significantly lowered, and thus there is a limit in quantitatively measuring distribution of force or pressure.

In addition, conventionally, a zero potential method (a ground potential method) is used to read changes of resistance in an element of a tactile sensor array, which is constructed using a resistor matrix, without interference of neighboring resistors. However, since a complex electronic circuit is needed in order to implement the zero potential method, it is difficult to integrate the electronic circuit with a small tactile sensor. Accordingly, as the tactile sensor is getting smaller and the number of arrays is increased, the number of signal lines is increased and the tactile sensor becomes further vulnerable to noises if the entire signal processing is performed outside the tactile sensor.

Therefore, it needs to develop a new sensor array which can quantitatively measure distribution of force or pressure, has flexibility and elasticity so as to be attachable to various curved surfaces, has a robust structure and chemical stability so as not to be easily damaged, and is able to preprocess a signal within a tactile sensor.

DISCLOSURE OF INVENTION

Technical Problem

Therefore, the present invention has been made in view of the above problems, and it is an object of the present invention to provide a force or pressure sensor array using a semiconductor strain gauge, which can provide flexibility, elasticity, and robustness by using a polymer material, in addition to a semiconductor strain gauge having high sensitivity, linearity, repeatability, and restorability.

Another object of the present invention is to provide a force or pressure sensor array using a semiconductor strain gauge, which can further correctly measure resistance and voltage values, simplify the configuration of a embedded circuit, and preprocess the signal within a tactile sensor by processing a signal corresponding to the change of resistance in each semiconductor strain gauge configuring a certain array pattern, using a flexible CMOS circuit.

Another object of the present invention is to provide a force or pressure sensor array using a semiconductor strain gauge, which can be used in various application fields, such as artificial skin (particularly, skin of robot's fingers that need accurate measurement and control of force), touch sensors, tactile sensors, and the like, while pursuing performance of a silicon-based force sensor, since the sensor array has flexibility and elasticity that cannot be provided by silicon-based sensors.

Technical Solution

To accomplish the above objects, according to one aspect of the present invention, there is provided a force or pressure sensor array using a semiconductor strain gauge, the sensor array comprising: a substrate including: the semiconductor strain gauge array in which a plurality of elements formed in a certain pattern is deformed by force or pressure, a pair of polymer film layers having film surfaces contacted facing each other and containing the semiconductor strain gauge between the film surfaces contacted with each other, and a pair of signal line layers formed on top and bottom surfaces of an insulating layer using either of the pair of polymer film layers as the insulating layer and connected to the elements of the array pattern to form electrodes, for fetching deformation signals outputted due to deformation of the elements to outside; and a pair of elastomer layers formed on both sides of the substrate to contain the substrate inside, wherein the pair of signal line layers includes a plurality of first signal lines arranged in one direction on one surface of the insulating layer and a plurality of second signal lines arranged to be perpendicular to the one direction, and resistance of the elements is changed based on the force or the pressure and the deformation signals are outputted based on the changes of resistance.

The first and second signal lines configure a CMOS circuit, the first signal lines are provided with P-MOSFETs for flowing a constant current to the first signal lines, and the substrate further includes a plurality of switches respectively connected to one end of each of the second signal lines and a switch control unit (decoder) for sequentially scanning each of the second signal lines to flow a current to any one of the second signal lines by controlling the switches.

Advantageous Effects

Therefore, according to an embodiment of the present invention described above, first, the sensor structure of the present invention is simple and robust. That is, a structure having a wide membrane is generally adopted as a sensing unit of a sensor in order to increase the strain, and since a ductile polymer substrate itself functions as a sensing unit in the present invention, the sensor structure is physically robust. In addition, since a polymer is generally a chemical inert material, the sensor structure of the present invention is chemically stable. Second, since a semiconductor strain gauge is fabricated by injecting impurities such as Boron (B) into non-organic silicon and forming piezo resistance, sensitivity of signals is extraordinarily superior. Furthermore, repeatability and reproducibility of the signal output from the semiconductor strain gauge is superior compared with a method using force sensitive resistors.

Third, since changes of resistance in each element configuring a semiconductor strain gauge array pattern are processed using a CMOS circuit signal processing method, it is possible to further correctly measure resistance and voltage values, simplify the configuration of a circuit, and preprocess a signal within a tactile sensor. Fourth, the force sensor array of the present invention may have both flexibility and elasticity. Since the substrate itself is a kind of a polymer material, the substrate can be bent or expanded. Although non-organic silicon, which is a material of the semiconductor strain gauge and the CMOS circuit, is easily broken and solid, mechanical flexibility can be secured if it is fabricated extremely thin. In addition, even elasticity can be provided if it is fabricated in a corrugated structure.

BRIEF DESCRIPTION OF THE DRAWINGS

FIG. 2 is a cross-sectional view showing the force or pressure sensor array taken along the line A-A in FIG. 1a.

BEST MODE FOR CARRYING OUT THE INVENTION

<Structure and Operation of Force or Pressure Sensor Array>

Figure 1A:
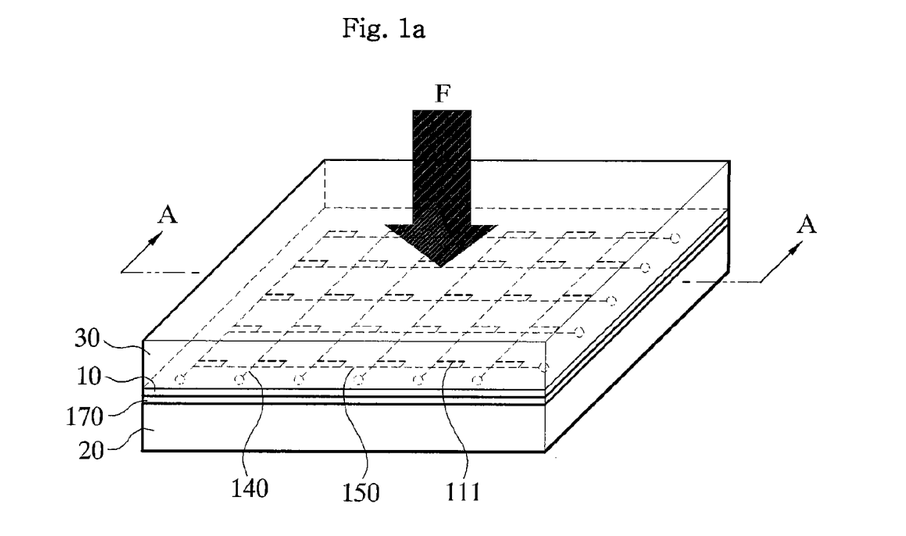
FIG. 1a is a perspective view showing a force or pressure sensor array using semiconductor strain gauges according to an embodiment of the present invention.
Figure 1B:
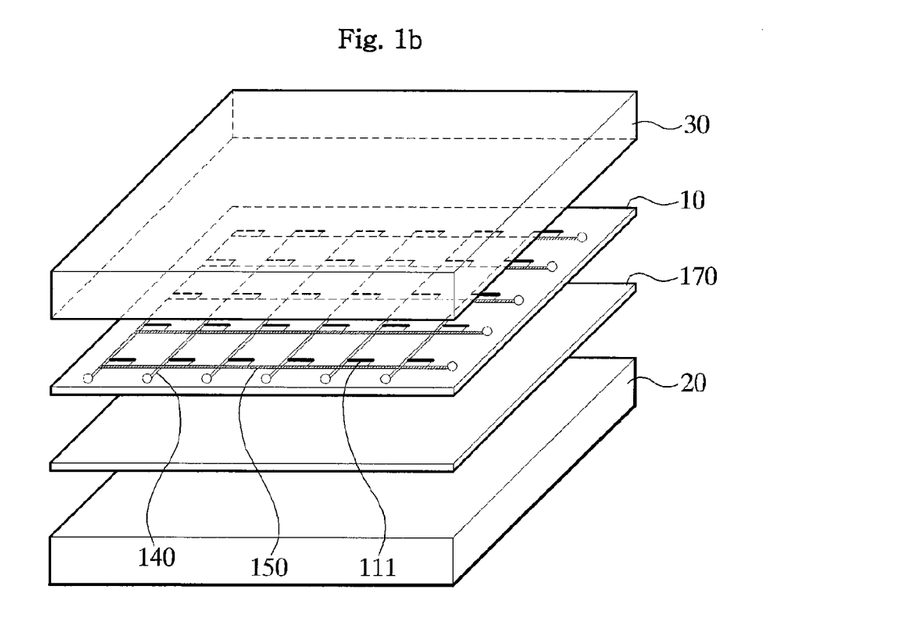
FIG. 1b is an exploded perspective view showing the force or pressure sensor array in FIG. 1 decomposed into a layer structure.

FIG. 1a is a perspective view showing a force or pressure sensor array using semiconductor strain gauges 100 according to an embodiment of the present invention, and FIG. 1b is an exploded perspective view showing the force or pressure sensor array in FIG. 1 decomposed into a layer structure. As shown in FIGS. 1a and 1b, the force or pressure sensor array according to an embodiment of the present invention comprises a substrate 10 and a pair of elastomer layers 20 and 30 bonded to both sides of the substrate. Here, a polymer film layer and semiconductor strain gauges 110 containing a plurality of elements 111 arranged in a specific array pattern are placed in the substrate 10, and a plurality of first and second signal lines respectively forming an electrode is provided in the substrate. In addition, the substrate 10 further includes a CMOS circuit layer 170 at the lower part of the substrate, where current sources 141 for flowing a constant current to the first signal lines 140, switches 151 respectively connected to one end of each of the second signal lines 150, and a switch control unit 160 for scanning the second signal lines 150 in real-time by controlling the switches are formed in a CMOS process.

The semiconductor strain gauges 110 having an array pattern of the plurality of elements 111 sense force or pressure based on the change of resistance when the semiconductor strain gauges are deformed with a superior sensitivity due to a high gauge factor. In addition, the semiconductor strain gauges are placed on the neutral axis in the middle of the entire layer structure, and the strain is 0 although the entire sensor array is bent.

The element 111 of the semiconductor strain gauge is provided in plurality and fabricated to have an array pattern, and the elements 111 are formed to have the same shape of a stick or a bar. The array pattern arranges all the bar-shaped elements in the direction of length to uniformly sense force or pressure applied on a large area, and each of the elements 111 can be fabricated to have a wave form, unlike the elements shown in the figure, in order to provide elasticity. Since the elements 111 are fabricated based on a silicon wafer 40, it is fabricated to have a thickness less than 100 μm in order to provide bendability.

The semiconductor strain gauge array 110 having a plurality of elements 111 arranged in a pattern is formed on a polymer film layer such as polyimide (PI). Since the polymer film layer is used as an insulating layer between the electrodes, the substrate 10 is preferably completed to have thin films of at least two or more layers. In the present invention, a pair of elastomer layers 20 and 30 functions as a sensing unit for initially sensing force F and as a protective film. Both sides of the pair of elastomer layers 20 and 30 are fabricated to have the same thickness (about 0.5 to 10 mm) in order to guarantee uniformity of force or pressure sensing.

In addition, the elastomer layers 20 and 30 (or polymer film layers) are formed of a poly-dimethylsiloxane (PDMS) layer in order to provide flexibility and elasticity in the present invention. In an embodiment of the present invention, as shown in FIG. 1a, 1f external force F is applied to the upper elastomer layer 30, elements 111 in a corresponding portion of the semiconductor strain gauge are deformed, and if resistance is changed due to the deformation, certain signals are outputted through a plurality of first and second signal lines 140 and 150, and the force or the pressure applied to the sensor of the present invention is measured.

Figure 2:
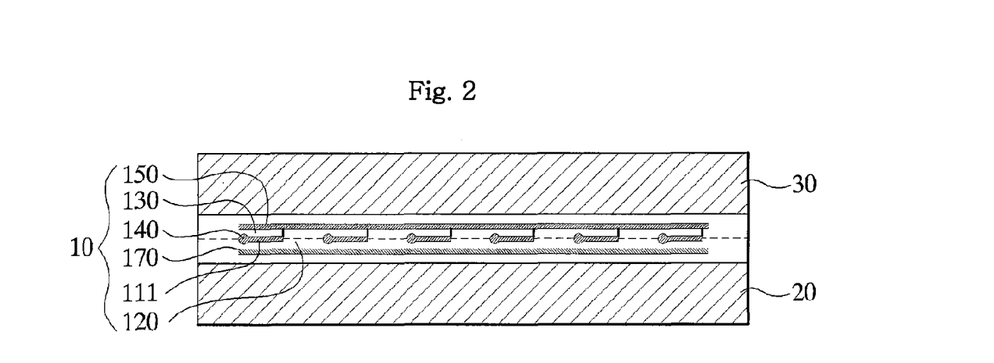

FIG. 2 is a cross-sectional view showing the force or pressure sensor array taken along the line A-A in FIG. 1a. As shown in FIG. 2, the substrate 10 of the present invention includes the semiconductor strain gauge array 110 arranged on a first polymer film layer 120. A first signal line 140 is connected to one end of each element 111, and a second signal line 150 is connected to the other end of the element ill. In addition, the elastomer layers 20 and 30 are boned to the upper and lower sides of the substrate 10.

Although the semiconductor strain gauge array 110 can be fabricated in a variety of array patterns, the thickness should be less than 100 µm in order to provide bendability, and after configuring a CMOS circuit, the plurality of first and second signal lines 140 and 150 for forming electrodes can be preferably transferred and formed through micro-fabrication processes, including a patterning process, metal evaporation, and the like, using a metal such as Au/Ti.

However, since the first signal lines 140 should be insulated from the second signal lines 150, a second polymer film layer 130 is further formed between the first and second signal lines 140 and 150 as an insulating layer, and the semiconductor strain gauge 110 can be connected to the second signal lines 150 through a hole. On the other hand, the first and second polymer film layers 120 and 130 are needed to configure circuits and wires and to rest the semiconductor strain gauge array 110 on the first polymer film. Each of the first and second polymer film layers 120 and 130 can be formed of a polyimide (PI) thin film layer having a thickness of 0.5 to 5 µm.

Figure 3:
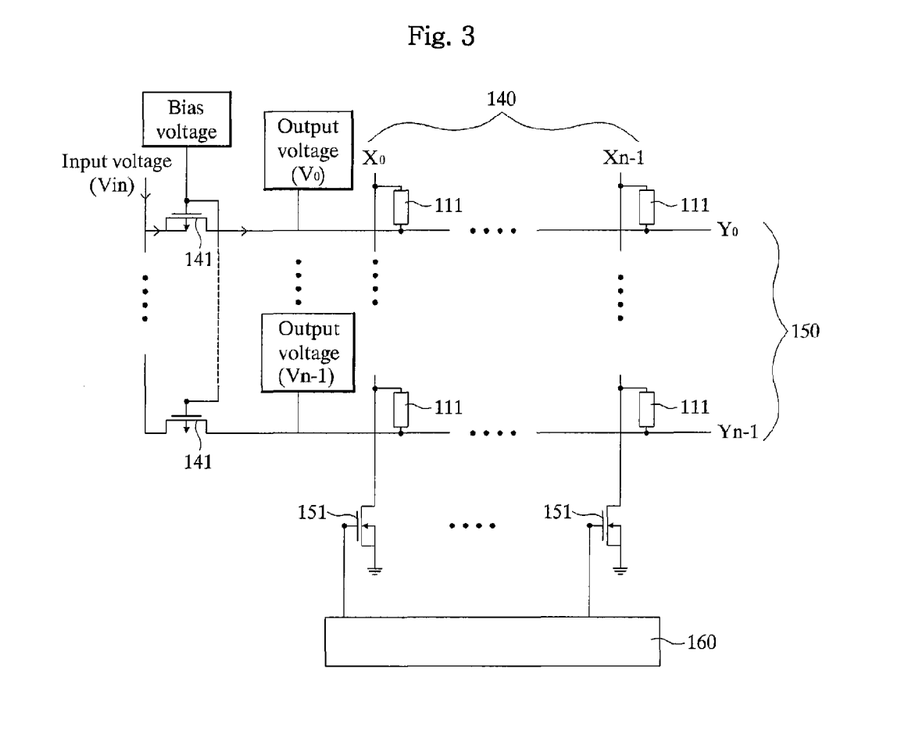
FIG. 3 is a circuit diagram showing first and second signal lines, switches, and a switch control unit in a substrate according to an embodiment of the present invention.

FIG. 3 is a circuit diagram showing first and second signal lines 140 and 150, switches 151, and a switch control unit 160 in a substrate according to an embodiment of the present invention. As shown in FIG. 3, a plurality $Y_0, Y_1 \ldots Y_{n-1}$ of first signal lines 140 is respectively connected to one end of each element 111 in parallel in one direction, and a plurality $X_0, X_1 \ldots X_{n-1}$ of second signal lines 140 is respectively connected to the other end of the element 111 to be perpendicular to the one direction. In addition, the plurality of first signal lines 140 is configured with P-MOSFETs and supplies a bias voltage to the current sources 141 to which an input voltage $V_{in}$ is applied in order to flow a constant current to each of the first signal lines 140 at all times.

In addition, as shown in FIG. 3, a switch 151 is connected to one end of each second signal line 150. Each of the switches 151 is connected to the switch control unit 160 that scans the second signal lines 150 in real-time by controlling the switches 151. Accordingly, the switch control unit 160 sequentially turns on any one of the switches 151 and turns off the other switches. The switch control unit 160 can be configured as a decoder or the like. Accordingly, if force or pressure is applied from outside, output voltages $V_0 \ldots V_{n-2}$ are measured at output terminals connected to the elements 111 where a resistance value is changed. Resistance and voltage values changed by the output voltages are calculated, and a value of the applied force or pressure is measured based on the resistance and voltage values.

Since the signal processing using a CMOS circuit is only a preferred example of a signal processing method, the present invention is not limited thereto, and the spirit and scope of the present invention should be defined by the appended claims.

<Method of Fabricating Force or Pressure Sensor Array>

Figure 4:
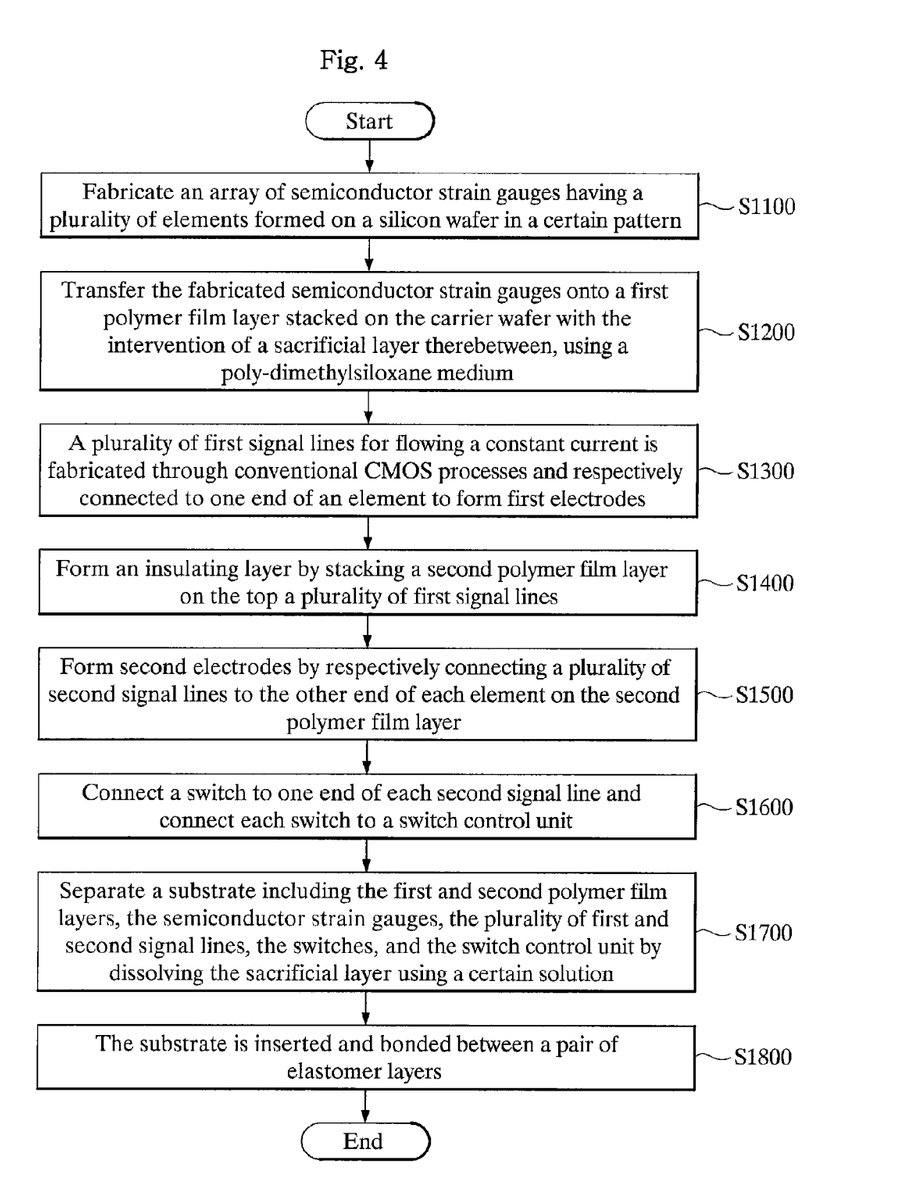
FIG. 4 is a flowchart sequentially illustrating a method of fabricating a force or pressure sensor array using a semiconductor strain gauge according to an embodiment of the present invention.

FIG. 4 is a flowchart illustrating a method of fabricating a force or pressure sensor array using a semiconductor strain gauge array 110 according to an embodiment of the present invention. First, a semiconductor strain gauge array 110 having a certain pattern is fabricated on a silicon wafer 40 S1100. The semiconductor strain gauge 110 is fabricated using a silicon-on-insulator (SIO) wafer or a mono-crystalline silicon wafer such that each of the elements 111 of the array pattern has a thickness of 0.1 to 100 µm. Particularly, since an etching film is inserted if the SIO wafer is used, thickness of the semiconductor strain gauge 110 can be easily adjusted.

Next, the fabricated semiconductor strain gauge 110 is transferred onto the first polymer film layer 120 stacked on the carrier wafer 60 with the intervention of a sacrificial layer 62 therebetween using a poly-dimethylsiloxane medium 50 S1200. The sacrificial layer 62 is poly methyl methacrylate (PMMA, acrylic resin), and the transfer process S1200 is performed using a polyimide thin film layer as the first polymer film layer 120.

Next, a plurality of first signal lines 140 is respectively connected to one end of each element 111 of the array pattern to form first electrodes 51300. Here, the plurality of first signal lines 140 can be transferred and formed in a CMOS process, and the plurality of first signal lines 140 is formed to be arranged in parallel in one direction. The first signal lines 140 are configured with P-MOSFETs to flow a constant current at all times by the current source 141.

Next, a second polymer film layer 130 is stacked on the top of the plurality of first signal lines 140, and thus an insulating layer is formed S1400. A polyimide thin film layer is used as the second polymer film layer 130, like the first polymer film layer 120. Next, the plurality of second signal lines 150 is connected to the other end of the element 111 on the second polymer film layer 130 to form second electrodes S1500. In addition, the plurality of second signal lines 150 is also transferred and formed in a CMOS process, and the plurality of second signal lines 150 is formed to be arranged in a direction perpendicular to the direction of arranging the plurality of first signal lines 140.

Next, a switch 151 is connected to one end of each second signal line 150, and each of the switches 151 is connected to the switch control unit 160 S1600. Next, the substrate 10 configured with the first and second polymer film layers, the semiconductor strain gauge 110, and the plurality of first and second signal lines is separated by dissolving the sacrificial layer 62 using a certain solution S1700. Finally, the substrate 10 is inserted and bonded between a pair of elastomer layers 20 and 30 S1800. In this manner, a method of fabricating a force or pressure sensor array of the present invention is performed.

On the other hand, in the gauge fabricating step S1100, a desired semiconductor strain gauge 110 of an array pattern can be fabricated by sequentially performing a lithographic printing process, an ion implantation process, and an etching process on the silicon wafer 40. Since these processes are apparent in fabricating a semiconductor strain gauge array, details thereof will be omitted. Although there may be some fabricating processes other than the general semiconductor strain array 110 fabricating process described above, a process of fabricating a semiconductor strain gauge array 110

(FIGS. 5a to 5d) in a method of extracting a microstructure using a mono-crystalline silicon wafer [Reference: A. J. Baca, et al., Adv. Func. Mater., 17, 3051 (2007)] can be used as a process of low cost.

Figure 5A:
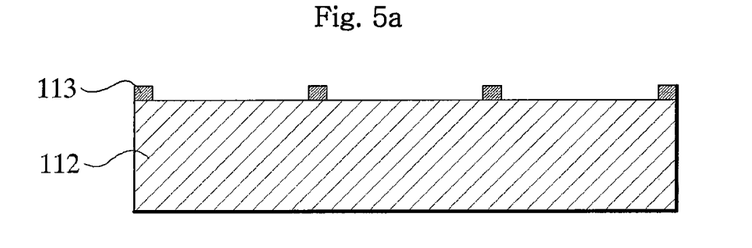
FIGS. 5a to 5d are cross-sectional views sequentially showing a process of fabricating semiconductor strain gauges in a configuration of a force or pressure sensor array using semiconductor strain gauges according to the present invention.
Figure 5B:
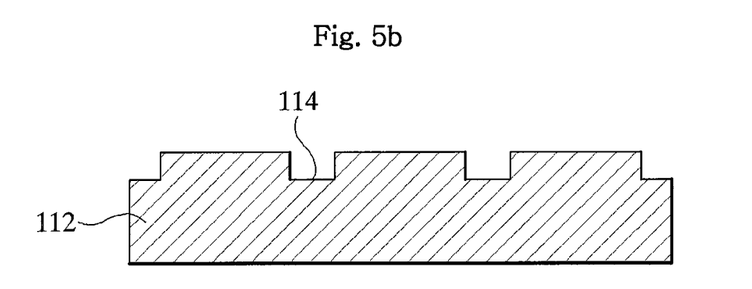

FIGS. 5a to 5d are cross-sectional views sequentially showing a process of fabricating a semiconductor strain gauge array 110 in a configuration of a force or pressure sensor array using a semiconductor strain gauge array 110 according to the present invention. As shown in FIG. 5a, photo resist 113 is coated on the mono-crystalline silicon 112 in a certain pattern considering a semiconductor strain gauge array 110 to be fabricated. Next, corresponding portions are removed through metal evaporation, and trenches 114 are formed through reactive ion etching (RIE). Then, if a sidewall refining process is performed in this state, fabrication of the mono-crystalline silicon shown in FIG. 5b is completed.

Figure 5C:
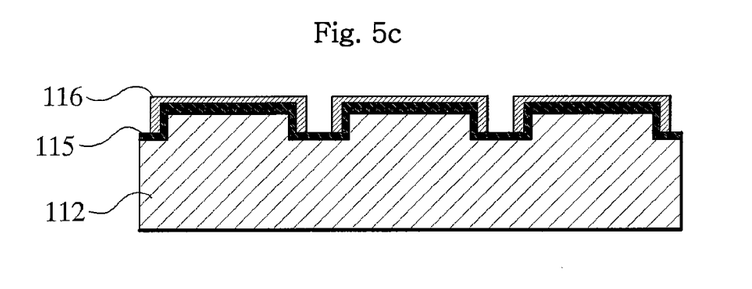
Figure 5D:
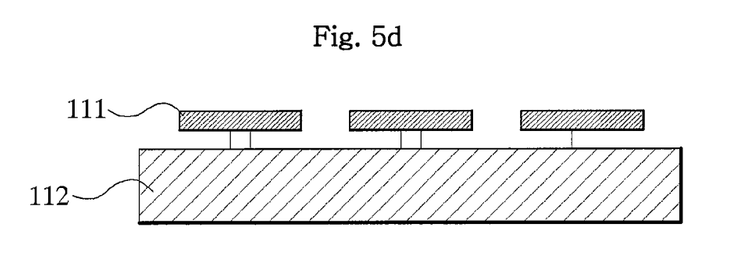

Next, as shown in FIG. 5c, a first protective film 115 and a second protective film 116 are sequentially formed. Here, $Si_3N_4/SiO_2$ is used as the first protective film 115, and Au/Ti is used as the second protective film 116. Next, the first and second protective films 115 and 116 are partially removed through the RIE process using CF4 plasma and the KOH etching process, and finally, if the first and second protective film 115 and 116 are completely removed, a semiconductor strain gauge array 110 of Si ribbon-shaped elements 111 having an pattern is completed.

Figure 6:
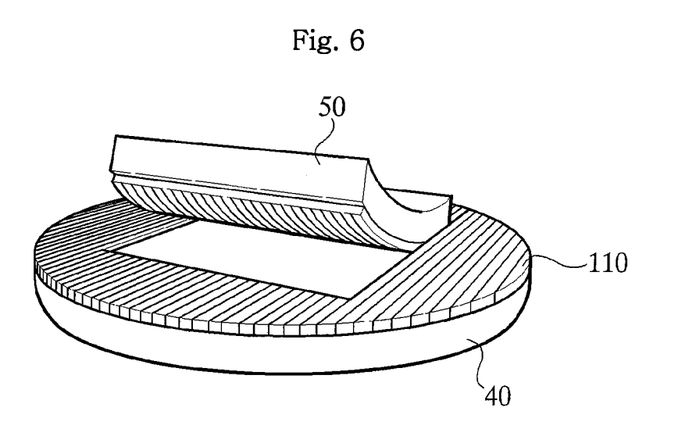
FIG. 6 is a perspective view showing a state of transferring semiconductor strain gauges in a method of fabricating a force or pressure sensor array using a semiconductor strain gauge according to the present invention.

FIG. 6 is a perspective view showing a state of transferring a semiconductor strain gauge array 110 in a method of fabricating a force or pressure sensor array using a semiconductor strain gauge array 110 according to the present invention. As shown in FIG. 6, the semiconductor strain gauges 110 having an array pattern are separated from the silicon wafer 40 as large as the area of the poly-dimethylsiloxane medium 50 using the poly-dimethylsiloxane medium 50 (or a PDMS stamp).

Figure 7:
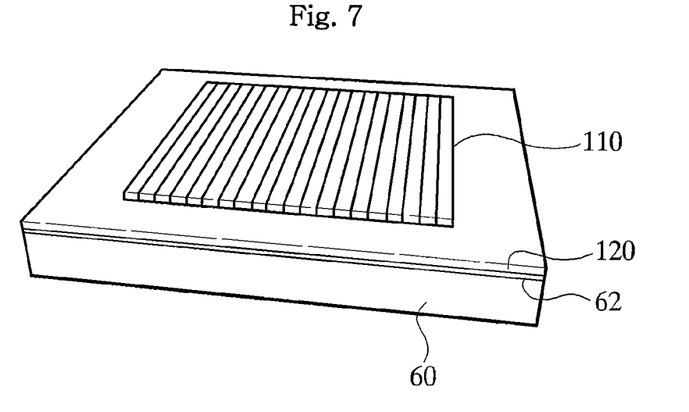
FIG. 7 is a perspective view showing a state of semiconductor strain gauges transferred on a carrier wafer layer in a method of fabricating a force or pressure sensor array using a semiconductor strain gauge according to the present invention.

FIG. 7 is a perspective view showing a state of a semiconductor strain gauge array 110 transferred on a carrier wafer 60 in a method of fabricating a force or pressure sensor array using semiconductor strain gauges 110 according to the present invention. As shown in FIG. 7, the semiconductor strain gauge array 110 is transferred and stacked onto the first polymer film layer 120 stacked on the carrier wafer 60 with the intervention of the sacrificial layer 62 therebetween. Here, the first polymer film layer 120 is formed of a polyimide thin film layer, and the sacrificial layer 62 is coated with poly methyl methacrylate (PMMA, acrylic resin).

Figure 8:
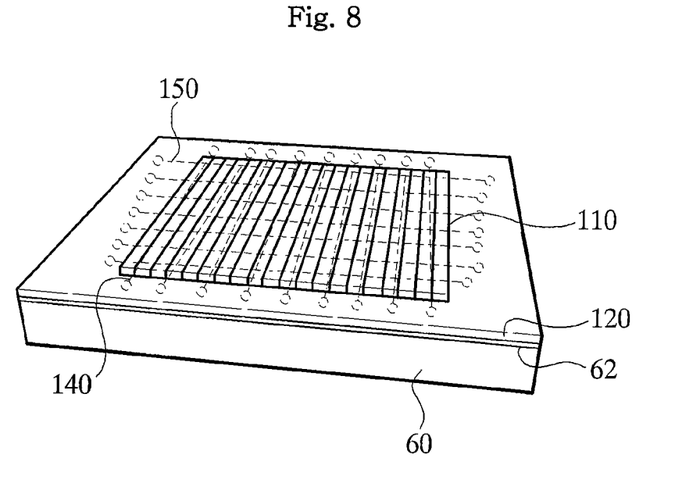
FIG. 8 is a perspective view showing a state of arranging a plurality of signal lines in a method of fabricating a force or pressure sensor array using semiconductor strain gauges according to the present invention.

FIG. 8 is a perspective view showing a state of arranging a plurality of signal lines in a method of fabricating a force or pressure sensor array using a semiconductor strain gauge 110 according to the present invention. As shown in FIG. 8, a plurality of first and second signal lines 140 and 150 is formed by transferring the signal lines in a CMOS process, thereby configuring a CMOS circuit. At this point, a detailed wire patterning process and other processes such as a spin coating and the like can be performed. The plurality of first and second signal lines 140 and 150 is formed to make certain X-axis electrodes and Y-axis electrodes perpendicular to the X-axis electrodes.

Figure 9:
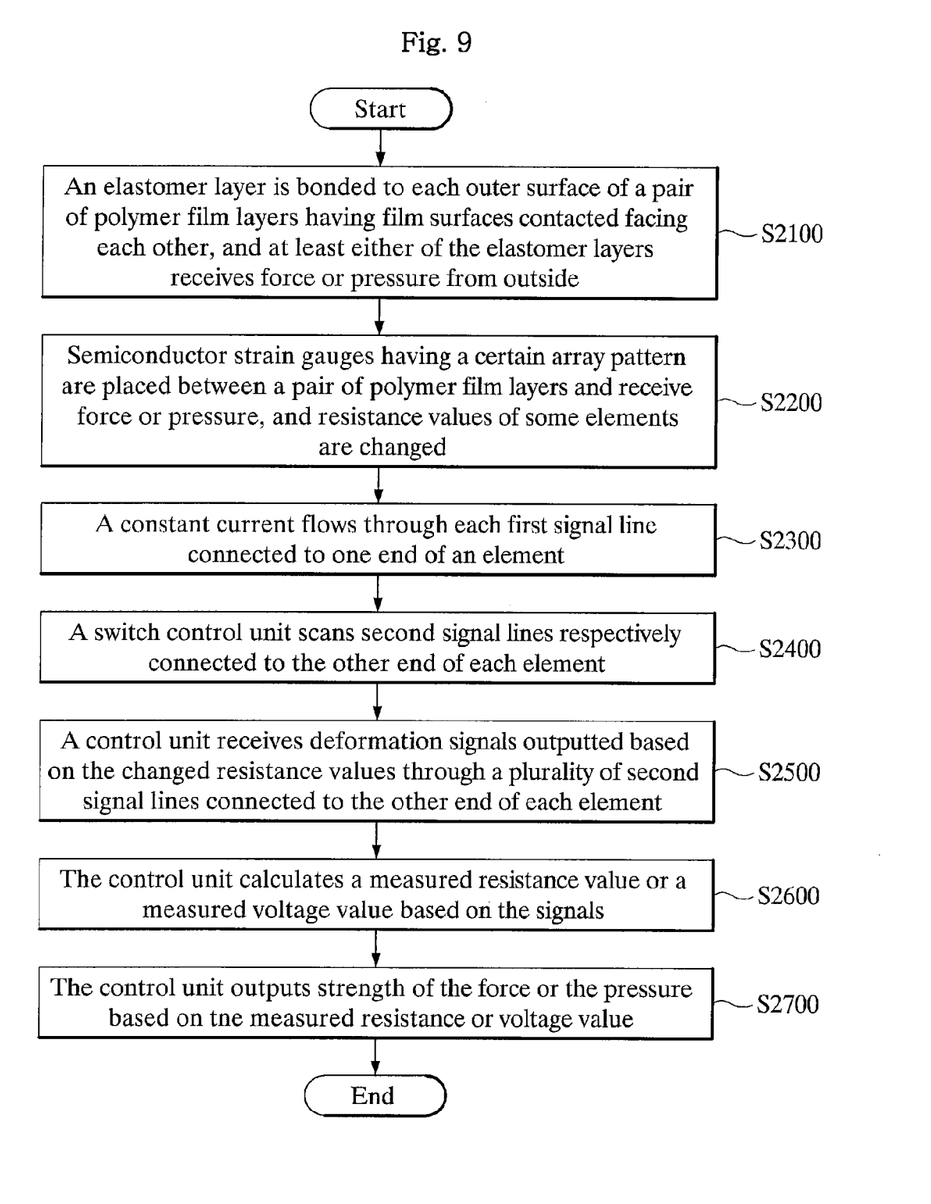
FIG. 9 is a flowchart sequentially illustrating a method of measuring force or pressure using a force or pressure sensor array according to the present invention.

FIG. 9 is a flowchart sequentially illustrating a method of measuring force or pressure using a force or pressure sensor array according to the present invention. As shown in FIG. 9, first, elastomer layers 20 and 30 are respectively bonded to each outer surface of a pair of polymer film layers 120 and 130 having film surfaces contacted facing each other, and at least either of the elastomer layers 20 and 30 receives force or pressure from outside S2100.

Next, a semiconductor strain gauge array 110 having a certain pattern is placed between the pair of polymer film layers 120 and 130 and receives the force or pressure, and resistance of some elements 111 adjacent to the point applied with the force is changed S2200. A constant current flows through the first signal lines 140 configuring a CMOS circuit and respectively connected to one end of each element S2300. As describe above, the first signal lines 140 are configured with P-MOSFETs to flow a constant current at all times by the current source.

Then, a switch control unit 160 scans the second signal lines 150 in real-time by controlling the switches 151 respectively connected to one end of each second signal line S2400. Next, after the second signal lines are scanned, a control unit (not shown) receives deformation signals outputted based on the changed resistance through a plurality of first and second signal lines connected to each element 111 of the array pattern S2500. Here, the control unit can be a computer capable of performing numerical operations and comparisons, which preferably has an input port for receiving a signal from the force or pressure sensor array of the present invention.

Next, the control unit calculates a measured resistance value or a measured voltage value based on the signals S2600. Finally, the control unit outputs strength of the force or the pressure based on the measured resistance or voltage value S2700. In this manner, a method of measuring force or pressure using a force or pressure sensor array is performed. Here, the method of measuring force or pressure preferably further includes the step of reading an initial resistance or voltage value stored in a buffer memory (not shown) in correspondence to each element 111 by the control unit, between the operation step S2600 and the output step S2700 of the control unit, in order to compare the measured value with the initial value and calculate and output strength of the force or the pressure based on the degree of correlation between the measured value and the initial value.

<First Variation of Force or Pressure Sensor Array>

Figure 10:
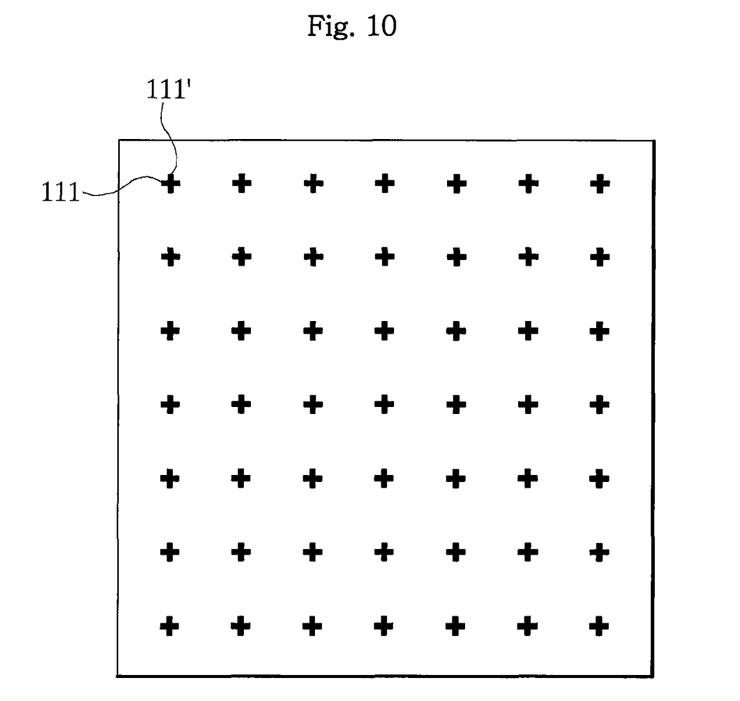
FIG. 10 is a plan view schematically showing an array pattern of bar-shaped elements arranged in the form of a cross as a first variation of a force or pressure sensor array using semiconductor strain gauges according to the present invention.

FIG. 10 is a plan view schematically showing an array pattern of bar-shaped elements 111 arranged in the form of a cross as a first variation of a force or pressure sensor array using semiconductor strain gauges 110 according to the present invention. As shown in FIG. 10, the first variation can be fabricated by preparing two substrates 10 where a plurality of bar-shaped (or stick-shaped) elements 111 and 111' is arranged in an array pattern as described above in an embodiment and overlapping the elements 111 of a substrate 10 with corresponding elements 111' of the other substrate 10 to form a cross shape. It is apparent that the force or pressure sensor array of the present invention is completed by bonding an elastomer layer to each outer surface of the two substrates 10 formed by overlapping the elements.

Second Variation of Force or Pressure Sensor Array>

Figure 11:
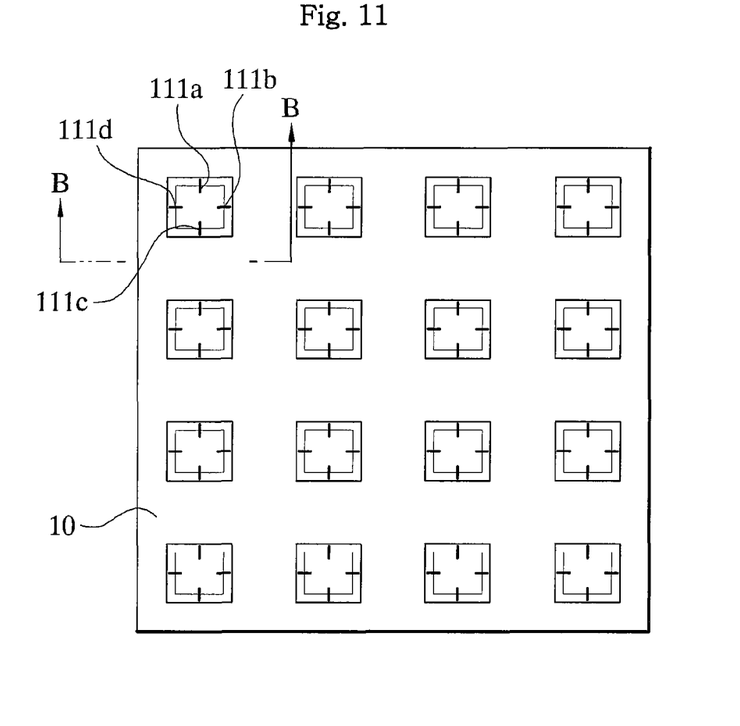
FIG. 11 is a plan view showing a state of forming protrusion structures on the top of an array pattern as a second variation of a force or pressure sensor array using semiconductor strain gauges according to the present invention.
Figure 12:
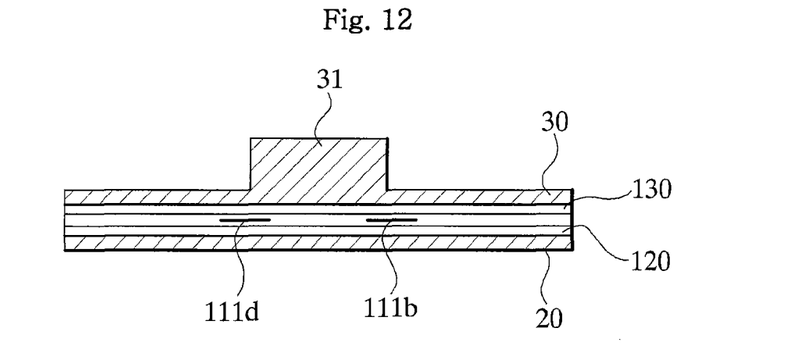
FIG. 12 is a cross-sectional view showing a protrusion structure taken along the line B-B in FIG. 11.

FIG. 11 is a plan view showing a state of forming protrusion 31 structures on the top of an array pattern as a second variation of a force or pressure sensor array using a semiconductor strain gauge 110 according to the present invention, and FIG. 12 is a cross-sectional view showing a protrusion structure taken along the line B-B in FIG. 11.

As shown in FIGS. 11 and 12, semiconductor strain gauges 111a, 111b, 111c, and 111d (번호 확인요망, 제가 가지고 있는 그림은 111 번으로 표기됨) are formed to have an array pattern arranged to face four directions below the border line formed by each protrusion 31 and the surface of the elastomer 30. Such a protrusion 31 structure is a structure capable of concentrating loads on points where semiconductor strain gauges 111a, 111b, 111c, and 111d are positioned and measuring forces or pressures of 3-axis directions.

The first and second variations described above can be fabricated in the fabricating method described above, and the method of measuring force or pressure can be performed in the same manner as described above except the measuring direction.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A flexible force or pressure sensor array using semiconductor strain gauges, the sensor array comprising:
    a substrate including: the semiconductor strain gauge array in which a plurality of elements formed in a certain pattern is deformed by force or pressure, a pair of polymer film layers having film surfaces contacted facing each other and containing the semiconductor strain gauge between the film surfaces contacted with each other, and a pair of signal line layers formed on top and bottom surfaces of an insulating layer using either of the pair of polymer film layers as the insulating layer and connected to the elements of the array pattern to form electrodes, for fetching deformation signals outputted due to deformation of the elements to outside; and
    a pair of elastomer layers formed on both sides of the substrate to contain the substrate inside, wherein
    the pair of signal line layers includes a plurality of first signal lines arranged in one direction on one surface of the insulating layer and a plurality of second signal lines arranged to be perpendicular to the one direction, and resistance of the elements is changed based on the force or the pressure and the deformation signals are outputted based on the changes of resistance.

2. The sensor array according to claim 1, wherein the first and second signal lines configure a CMOS circuit, the first signal lines are provided with P-MOSFETs for flowing a constant current to the first signal lines, and the substrate further includes a plurality of switches respectively connected to one end of each of the second signal lines and a switch control unit for sequentially scanning each of the second signal lines to flow a current to any one of the second signal lines by controlling the switches.

3. The sensor array according to claim 1, wherein the pair of polymer film layers is a pair of polyimide thin film layers.

4. The sensor array according to claim 1, wherein the element has a shape of a bar, and the array pattern is a pattern arranging all the bar-shaped elements in a direction of length.

5. The sensor array according to claim 4, wherein the sensor array has two substrates, and the two substrates are bonded together as one body by overlapping elements of a substrate with corresponding elements of the other substrate to cross each other.

6. The sensor array according to claim 4, wherein a plurality of protrusions is uniformly formed on a surface of either of the elastomer layers, and the array pattern is a pattern arranged to face four directions below a border line formed by each protrusion and the surface of the elastomer layer.

7. The sensor array according to claim 2, wherein the pair of signal line layers is transferred and formed through metal evaporation or a CMOS process.

8. The sensor array according to claim 1, wherein the pair of elastomer layers is a pair of poly-dimethylsiloxane layers.

* * * * *